United States Patent [19]

Backhaus et al.

[11] 3,964,132

[45] June 22, 1976

[54] APPARATUS FOR SEPARATING THE FILLETS OF A FLATFISH

[75] Inventors: Horst Backhaus; Heinz Schröder, both of Lubeck, Germany

[73] Assignee: Nordischer Maschinenbau Rud. Baader, Lubeck, Germany

[22] Filed: Sept. 6, 1974

[21] Appl. No.: 503,714

[30] Foreign Application Priority Data
Oct. 9, 1973   Germany............................ 2350561

[52] U.S. Cl. .................................................. 17/57
[51] Int. Cl.² ......................................... A22C 25/16
[58] Field of Search ...................... 17/57, 56, 54, 55

[56] References Cited
UNITED STATES PATENTS

| | | |
|---|---|---|
| 2,424,057 | 7/1947 | Savrda .................................... 17/54 |
| 2,427,626 | 9/1947 | Savrda .................................... 17/57 |

FOREIGN PATENTS OR APPLICATIONS

| | | |
|---|---|---|
| 97,124 | 6/1972 | Germany ................................ 17/57 |

*Primary Examiner*—Hugh R. Chamblee
*Assistant Examiner*—James D. Hamilton
*Attorney, Agent, or Firm*—Edward F. Levy

[57] ABSTRACT

Apparatus for separating the fillets of a flatfish comprising a backbone path on the back and belly sides of which are provided one pair each of circular filleting knives, conveyor disks, and backbone guides, and a separating tool with scraping edges, wherein the back disks are stationary and the belly ones swiveling, the backbone guides enter between said disks which are inclined to each other and double-sided truncated cones, the inner sides of each disk pair form narrow gaps in the region of the backbone path and have serrations.

2 Claims, 4 Drawing Figures

APPARATUS FOR SEPARATING THE FILLETS OF A FLATFISH

BACKGROUND OF THE INVENTION

1. Field of Invention

The invention relates to an apparatus for separating the fillets of a flatfish from its skeleton in the region of its belly cavity and along its main backbone including a pair of circular belly filleting knives rotating about a fixed axis situated on one side of a path for the main backbone and pair of circular back filleting knives situated on the other side of said path, rotating about an axis supported by a first arm swiveling about a fixed axis, and held in their operating position by means of a pressure spring and a first adjustable stop, a pair of backside conveyor disks on one side of said path and pair of belly side conveyor disks on the other side of said path, two pairs of backbone guides, one pair situated on the belly side of said path beneath the outer surface of the belly filleting knives, and the other pair on the other side of said path beneath the outer surfaces of the back filleting knives, and a separating tool crossing said path at an angle differing from 90° near the line connecting the centers of the backside conveyor disks and the bellyside conveyor disks, this separating tool including two rib scraping tools each of these having a scraping edge.

2. Description of Prior Art

GDR Patent Specification No. 97,124 discloses an apparatus comprising a pair of circular dorsal knives and a pair of circular abdominal knives, spring loaded guide wings arranged as synchronously coupled pairs in front of the abdominal and dorsal knives and a pair of conveyors arranged in a plane normal to and between said abdominal and dorsal knives, in which the abdominal knives together with the pairs of guide wings are arranged stationarily, where as the dorsal knives are arranged to give way against the force of spring means in such a manner that in the position of rest the space between the cutting edges of the abdominal and the dorsal knives amounts to a few millimeters and that a window is provided between the innermost guide wings of the abdominal knives as well as between the innermost guide wings of the dorsal knives. From each side a conveyor projects into these windows. Both conveyors are driven synchronously and allowed to give way resiliently, while a pair of bone guides is arranged in direction of said windows, each of said bone guides covering the cutting edges of the abdominal knives. Adjacent to each of said dorsal knives a pair of peeling tools is arranged. However, in such apparatus it is impossible to achieve positive transport during the action of the peeling tools.

Object of Invention

The object of the invention is to overcome said disadvantage by guiding the skeleton of the fish past the filleting tools and positively conveying it during the action of the peeling tools.

SUMMARY OF INVENTION

According to the present invention the backside conveyor disks turn about two stationary axes and the bellyside conveyor disks about two axes supported by a second arm, swiveling about a stationary axis and held in its operating position by means of a pressure spring and a second adjustable stop; the lower ends of each pair of backbone guides enter between the two conveyor disks of a respective disk pair; the backside conveyor disks and the bellyside conveyor disks are inclined towards one another thus confining narrow gaps between the inner sides of a disk pair, these inner sides having outer ring portions formed by truncated cones provided with serrations, the steep flanks of which are leading, their shoulders being tangent lines to a circle having a diameter of only part of the diameter of a conveyor disk, these tangents including a positive angle with a radius vector; and the outer sides of the conveyor disks are formed by truncated cones, the surfaces of which lying closely adjacent to the wedge-shaped scraping edges of the rib scraping tools.

It is a main advantage of the invention that the bellyspines and the backspines of the skeleton of a flatfish are gripped fixedly by the serrations of the traction disks, thus enabling the latter to convey the fish positively even against the resistance caused by the action of the rib scraping tools. It is another advantage of the invention that there is an automatical adjustment to the thickness of the rib containing part left on the skeleton by the rib scraping tools by dislocation of the belly conveyor disks with respect to the force exerted by the varying diameters of the vertebrae.

The invention can be carried into practice in various ways but one specific embodiment will now be discribed by means of an example with reference to the accompanying drawings.

DESCRIPTION OF THE PREFERRED EMBODIMENT

Figure 1:
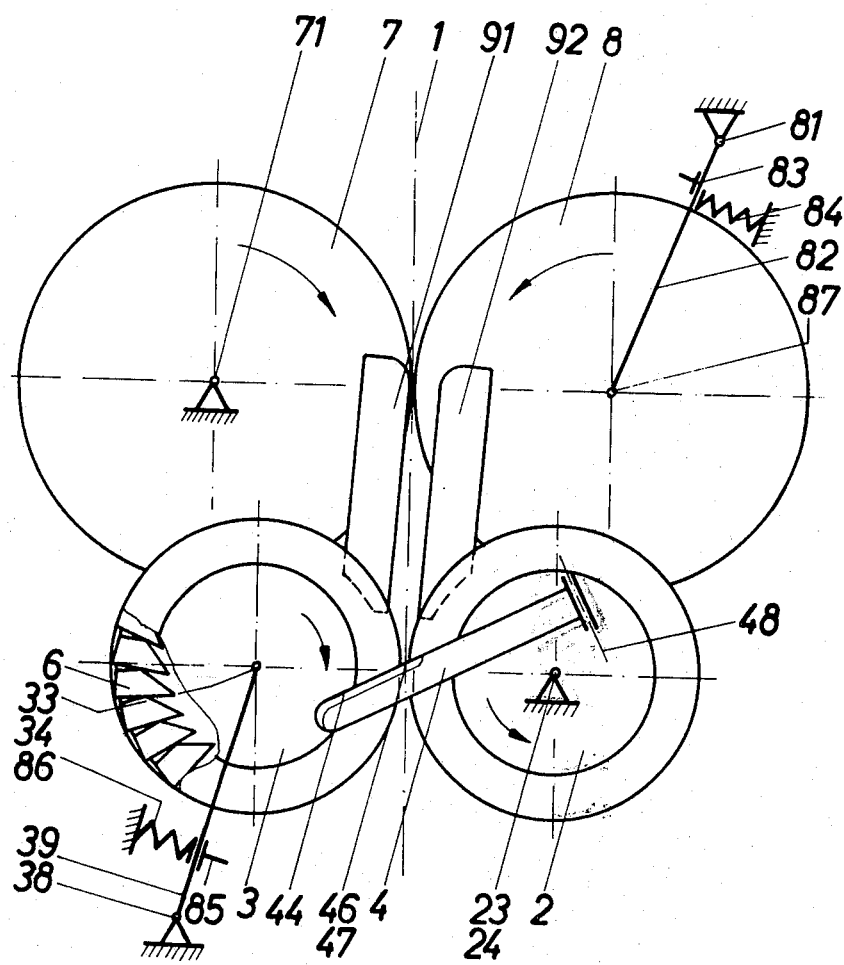
FIG. 1 is a diagrammatic side elevation of an apparatus according to the present invention.
Figure 2:
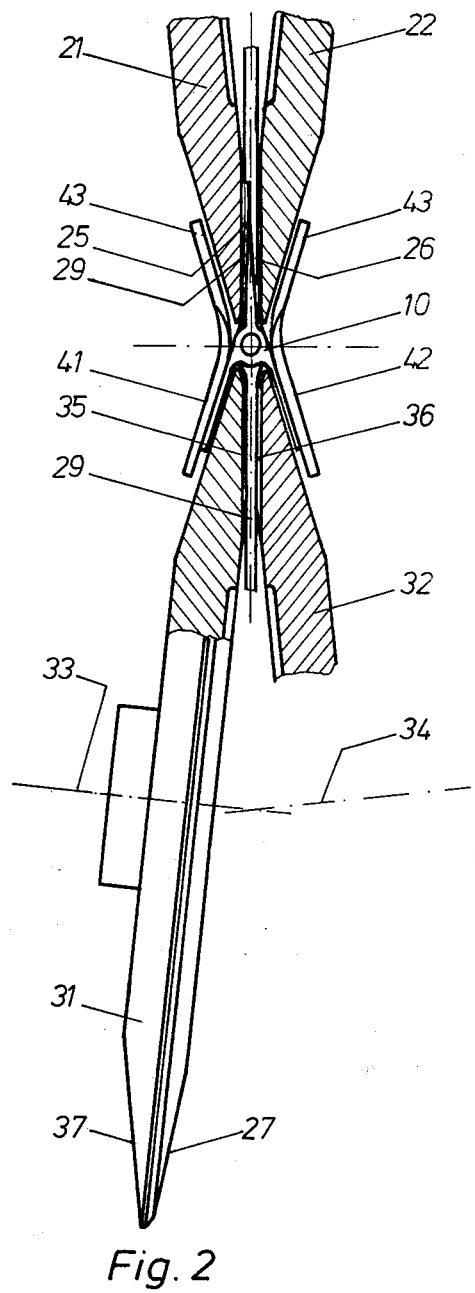
FIG. 2 is a section view in a horizontal plane through the pairs of the conveyor disks.
Figure 3:
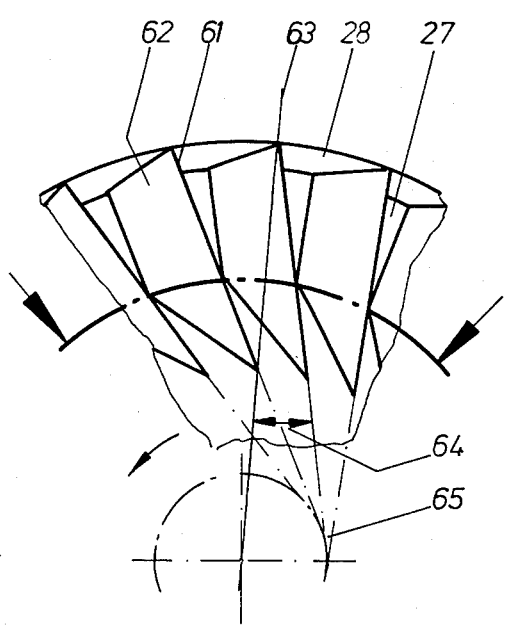
FIG. 3 is a sectional plan view of the inner side of a conveyor disk.
Figure 4:
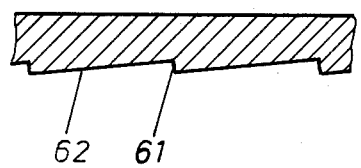
FIG. 4 is a section view through the serration of a conveyor disk as shown in FIG. 3.

In a frame (not illustrated in the drawings) a pair of spaced belly filleting knives 7 is arranged to rotate clockwise about a horizontal axis 71 and positively driven by known means. A pair of back filleting knives 8 is arranged to rotate anticlockwise about an axis 87 at the free end of a first arm 82. This arm 82 is pivotable about a horizontal axis 81 of the frame and is held resiliently against a first adjustable stop 83 by a pressure spring 84, whereby a varying space between the cutting edges of the belly filleting knives 7 and the back filleting knives 8 is effected. This space has a width of 2 or more millimeters thus forming a path 1 for the backbone of the fish. Guide means of known type and not shown are arranged in front of and above the two pairs of filleting knives 7, 8. Backbone guide means are provided behind the two pairs of filleting knives 7, 8 and comprise a pair of backbone guides 91 situated on the bellyside of path 1 and a pair of backbone guides 92 situated on the backside, the lower ends of the guides entering the nips formed by a backside conveyor 2 and a bellyside conveyor 3. The backside conveyor 2 is formed by a pair of conveyor or traction disks 21, 22 turnable anticlockwise about two axes 23, 24 fixed to the frame, while the bellyside conveyor 3 is formed by another pair of conveyor or traction disks 31, 32 turnable about two axes 33, 34 supported by a second arm 39 swivelling about an axis 38 fixed to the frame, the second arm 39 being loaded and held against a second adjustable stop 85 by means of a pressure spring 86. Two rib scraping tools 41, 42 forming a separating tool 4 are provided on supports 43 which are pivotable about two parallel axes 48 on the frame, scraping edges 44 of said tools crossing said path 1 at an angle differing from 90° near the line connecting the centers of the backside and bellyside traction disks 21, 22 and 31, 32. According to FIG. 2 axes 23, 24, and 33, 34 respectively include obtuse angles, the traction disks 21, 22, and 31, 32 respectively being inclined to one another, thus leaving narrow gaps 29 between their juxtaposed sides beneath path 1. Outer ring portions 27 of the inner side of each traction disk 21, 22, and 31, 32 respectively form truncated cones, the generating lines 25, 26, and 35, 36 respectively of which are forming said gaps 29. According to FIG. 3 and FIG. 4 the outer ring portions 27 are provided with serrations 6 having steep flanks 61, which are running ahead. The shoulders of the steep flanks form tangent lines to a circle 65 of e.g. a quarter of the diameter of the traction disks, while said tangent lines include a positive angle 64 with a radius vector 65. The outside edge of said outer ring portion 27 is provided with a chamfer 28. The outer surfaces of the traction disks 21, 22 and 31, 32 respectively are also shaped as truncated cones 37. As shown in FIG. 2 said scraping edges 44 are wedge-shaped lying closely adjacent to the surfaces of the outer truncated cones 37 thus forming separating edges 46 and 47 near said path 1 of the backbone.

In operation of the apparatus a beheaded flatfish is fed from above tailend leading between guiding means not shown. At first the fish is engaged by the filleting knives 7, 8, the belly filleting knives 7 making a pair of parallel incisions from the bellyside and the back filleting knives 8 another pair of incisions from the backside. Since these pairs of incisions are made in close contact to its bone structure the fish is moved ahead by frictional engagement of the filleting knives, its vertebrae being guided in the path 1 of the backbone between the backbone guides 91, 92. Each of these pairs of backbone guides 91, 92 gives way to allow the bellyspines or the backspines adhering to the backbone to pass, thus enabling the latter to enter the gaps 29 between the respective pairs of traction disks 21, 22, or 31, 32, where they are engaged by the serrations 6 and the bone structure of the fish is advanced in a positive motion. If the tail root of the fish arrives at line connecting the axes 23, 24, 33, 34 the separating edges 46, 47 of the separating tools 4 begin to sever the fillets from the backbone cutting across the strips of flesh, adhering to the vertebrae and not cut by the two pairs of filleting knives 7, 8. Before the belly portion of the fish approaches the separating tools 4 the backbone of the fish has dislocated the bellyside conveyor 3 to the left, giving way between the outer truncated cones 37 of the latter and the scraping edges 44 of the separating tools 4. This enables the ribs of the fish to pass under the separating tools 4, the flanks of the fish in the region of its belly being peeled from the ribs by said scraping edges 44.

What we claim as our invention and desire to secure by Letters Patent is:

1. An apparatus for separating the fillets of a flatfish from its skeleton in the region of its belly cavity and along its main backbone, said apparatus including
   a pair of circular belly filleting knives rotating about a fixed axis and located on one side of a path for the main backbone of the fish,
   a pair of curcular back filleting knives located on the other side of said path in alignment with said pair of belly filleting knives,
   a first arm rotatably mounted on a fixed axis and rotatably mounting said back filleting knives thereon,
   spring means biasing said first arm against an adjustable strip to locate said back filleting knives in an operative position closely spaced from said belly filleting knives,
   a pair of backside conveyor disks on one side of said path downstream from said filleting knives, and rotating about two stationary axes,
   a pair of belly side conveyor disks on the other side of said path in alignment with said backside conveyor disks, said belly side conveyor disks rotating about two axes supported by a second arm pivotable about a stationary axis and biased to an operating position against a second adjustable stop,
   two pairs of backbone guides, one pair located on the belly side of said path beneath the outer surface of the belly filleting knives, and the other pair located on the opposite side of said path beneath the outer surfaces of the back filleting knives,
   and a separating tool crossing said path at an oblique angle near the line connecting the centers of the backside and belly side conveyor disks, said separating tool including two rib scraping tools each having a scraping edge,
   the lower edge of each pair of backbone guides entering between the two conveyor disks of a respective disk pair, and the backside conveyor disks and belly side conveyor disks being inclined towards one another to thereby define narrow gaps between the inner sides of a disk pair.

2. An apparatus according to claim 1 in which the inner side of each conveyor disk has outer ring portions formed by truncated cones provided with serrations, having leading steep flanks, said steep flanks having shoulders located on tangent lines to a circle having a diameter of only part of the diameter of a conveyor disk, said tangent lines including a positive angle with a radius vector, and in which the outer sides of the conveyor disks are formed by truncated cones, the surfaces of which lie closely adjacent to the wedge-shaped scraping edges of the rib scraping tools.

* * * * *